United States Patent

Noar et al.

[15] 3,706,231
[45] Dec. 19, 1972

[54] TURBULENCE AND VORTEX SUPPRESSION IN GYROS

[72] Inventors: Raymond Noar, Bellflower; Robert H. Tuffias, Costa Mesa; Kenneth P. Gow, Whittier; Thomas A. Drew, Orange, all of Calif.

[73] Assignee: North American Rockwell Corporation

[22] Filed: Oct. 2, 1970

[21] Appl. No.: 77,472

[52] U.S. Cl. ....................................... 74/5 R, 74/5.7
[51] Int. Cl. ............................................ G01c 19/04
[58] Field of Search .......... 74/5, 5.7, 5.43; 33/204 R; 308/DIG. 1, 9; 138/39; 415/213 T

[56] References Cited

UNITED STATES PATENTS 3,545,890  12/1970  Hubbard et al. ............... 415/213 UX
2,479,349  8/1949   Hagg ........................... 308/DIG. 1
3,468,170  9/1969   Evans .......................... 74/5
3,362,231  1/1968   Baldwin et al. ................ 74/5

FOREIGN PATENTS OR APPLICATIONS 961,285  6/1964  Great Britain ...................... 74/5

*Primary Examiner*—Manuel A. Antonakas
*Attorney*—L. Lee Humphries, Edward Dugas, H. Fredrick Hamann and Martin E. Gerry

[57] ABSTRACT

A gyro in which the rotor operates in a fluid medium generally has a non-laminar flow causing gyro drift and hence inaccuracy. Certain inventive features are built into the structure of the tyro which minimize vortex or turbulent flow in the fluid medium together with minimization of waviness of vortex or turbulent flow, thereby increasing the drift stability of the gyro.

4 Claims, 16 Drawing Figures

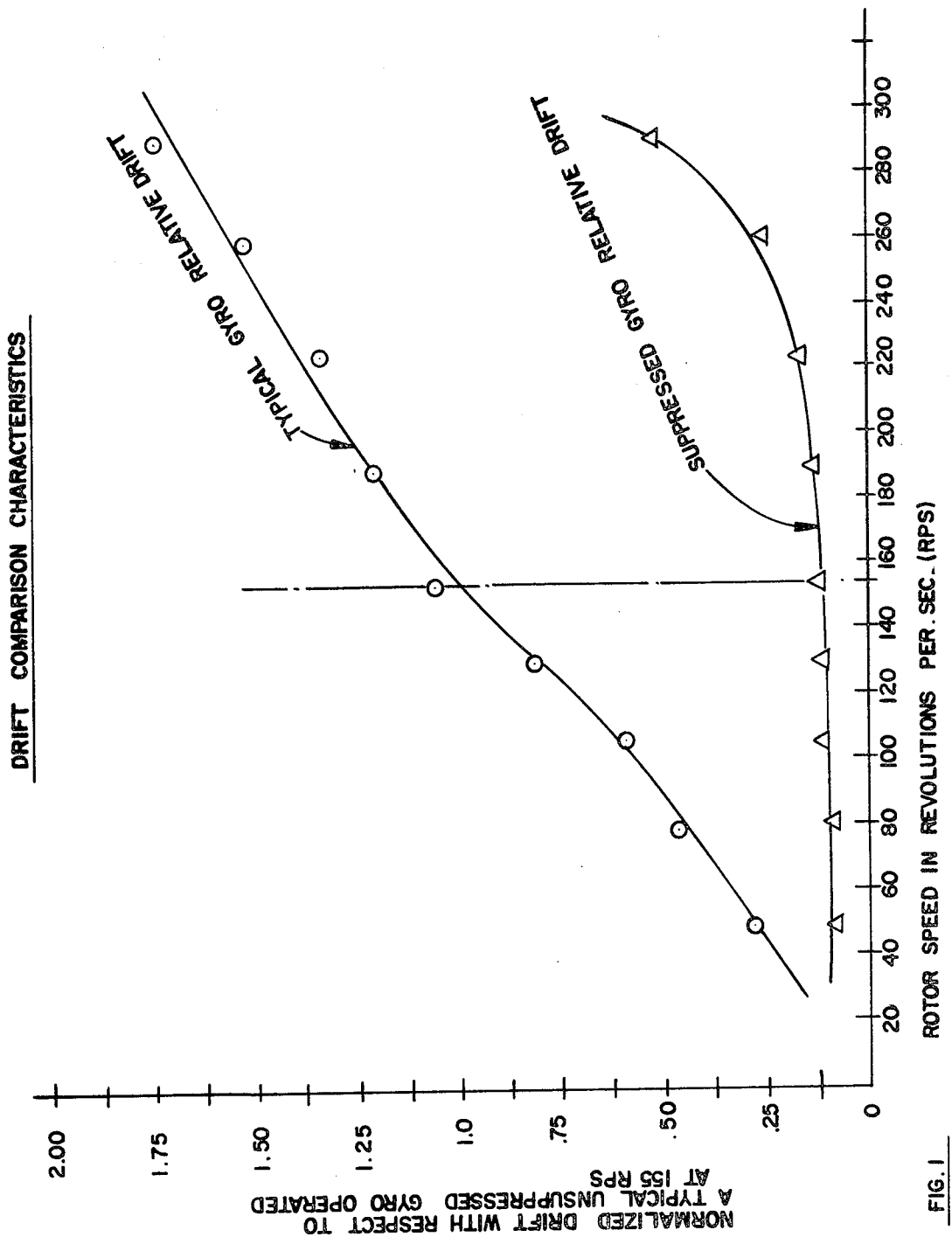

PATENTED DEC 19 1972 3,706,231

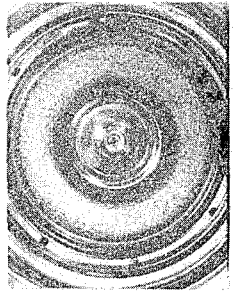

FIG. 2 LAMINAR FLOW IN ROTOR WEB AT 20% NORMAL SPEED WITHOUT SUPPRESSION

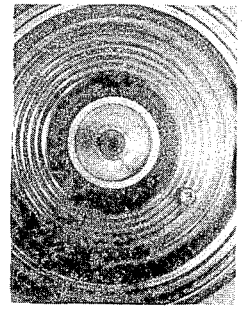

FIG. 3 FLOW IN ROTOR WEB AT 20% NORMAL SPEED WITH SUPPRESSION

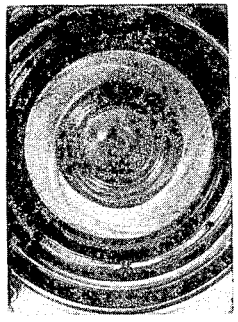

FIG. 4 VORTEX FLOW IN ROTOR WEB AT NORMAL SPEED WITHOUT SUPPRESSION

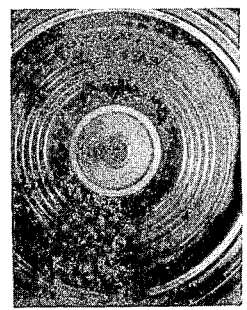

FIG. 5 FLOW IN ROTOR WEB AT NORMAL SPEED WITH SUPPRESSION

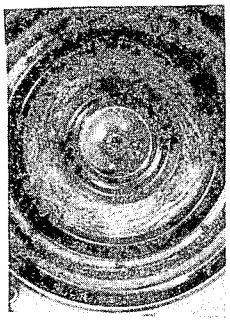

FIG. 6 TURBULENT FLOW IN ROTOR WEB AT 200% OF NORMAL SPEED WITHOUT SUPPRESSION

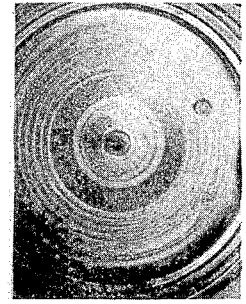

FIG. 7 FLOW IN ROTOR WEB AT 200% OF NORMAL SPEED WITH SUPPRESSION

INVENTORS
RAYMOND NOAR
ROBERT H. TUFFIAS
BY KENNETH P. GOW
THOMAS A. DREW

Martin E Gerry
AGENT

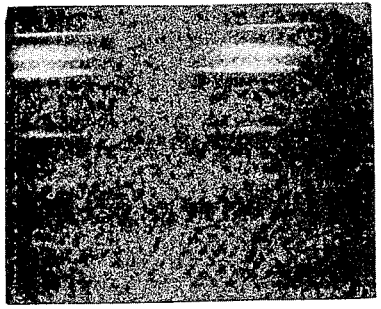

FIG. 8 VORTEX FLOW STARTED AT ROTOR OUTER PERIPHERY AT 30% NORMAL SPEED WITHOUT SUPPRESSION

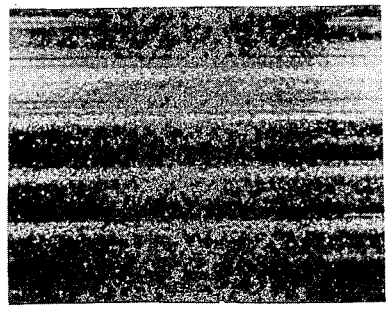

FIG. 9 FLOW AT ROTOR OUTER PERIPHERY AT 30% NORMAL SPEED WITH SUPPRESSION

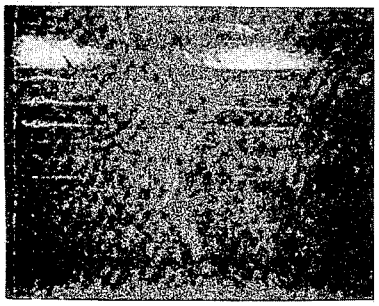

FIG. 10 VORTEX WAVINESS STARTING AT ROTOR OUTER PERIPHERY AT 80% NORMAL SPEED WITHOUT SUPPRESSION

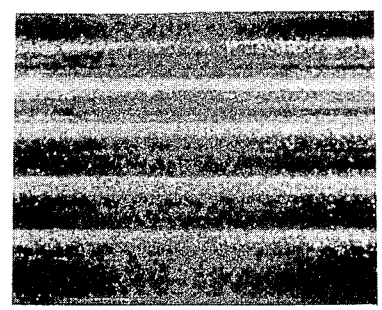

FIG. 11 FLOW AT ROTOR OUTER PERIPHERY AT 80% NORMAL SPEED WITH SUPPRESSION

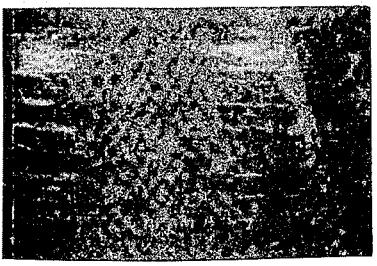

FIG. 12 VORTEX WAVINESS AT ROTOR OUTER PERIPHERY AT NORMAL SPEED WITHOUT SUPPRESSION

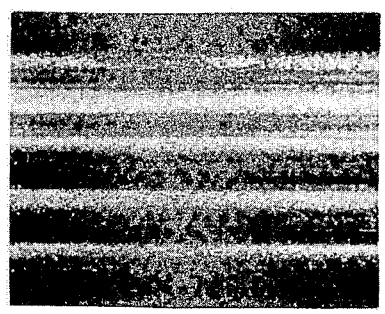

FIG. 13 FLOW AT THE ROTOR OUTER PERIPHERY AT NORMAL SPEED WITH SUPPRESSION

INVENTORS
RAYMOND NOAR
ROBERT H. TUFFIAS
BY KENNETH P. GOW
THOMAS A. DREW

Martin E Gerry

AGENT

TURBULENCE AND VORTEX SUPPRESSION IN GYROS

BACKGROUND OF THE INVENTION

1. Field of Invention

This invention relates to gyros such as those of the inertial navigation type which primarily are of the free rotor type. Such gyros are given to disturbance due to turbulence in the fluid medium surrounding the rotor, which this inventions seeks to minimize.

2. Prior Art

The free rotor gyro to which this invention is applicable consists of a rotor supported on a spherical gas bearing which may be of the auto lubricated hydrodynamic type. The rotor is provided with a housing to contain a low density gas intended to minimize the momentum forces exerted on the rotor by the gas. Also contained in the housing are a spin motor, a means for providing precise torques to control the rotor position and inertial rates, and a transducer which provides a signal relating the rotor angular position relative to the housing about axes normal to spin.

Existence of torques due to gas turbulence which disturb rotor action has been a problem requiring solution. Free rotor gyro designs employ devices to smooth the gas flow by covering irregular surfaces such as wire terminals with a smooth contoured surface, as well as using gases with minimum density.

Schlicting, in "Boundary Layer Theory", McGraw Hill (1960), includes an analysis of the flow state of a gas in the cylindrical gap adjacent to the outer diameter of a wheel in a housing. Taylor, in "Stability of a Viscous Liquid Contained Between Two Rotating Cylinders", Proc. Royal Soc. London A157,546,565, (1936), explained the formation of cellular vortices with circumferential vortex axes, as had been reported by L. Prandtl, in "Boundary Layer Theory", supra, who also gave the criteria for onset of such vortices as:

$$(U_i h/\nu) \sqrt{h/R_i} > 41.3$$

where $h$ is the gap dimension in the radial direction, $R_i$ is the inner radius, $U_i$ is the peripheral velocity of the inner cylinder and $\nu$ is the kinematic viscosity.

The formation of spiral vortices in the gas in the region adjacent to the web side face of a rotor was described by N. Gregory, J. T. Stuart, and W. S. Walker in "Stability of Three Dimensional Boundary Layers with Application to the Flow due to a Rotating Disk," Phil. Trans. Royal Soc., London A248, 155-159 (1955). The criteria for onset of spiral vorticity and the criteria for transition to turbulent flow were given as:

$$1.9 = 10^5 < R^2\omega/\nu \text{ Onset of vorticity}$$

$$2.8 = 10^5 < R^2\omega/\nu \text{ Transition to turbulence}$$

Where $R$ is the radius at any point $\omega$ is the angular velocity.

The random drift of the gyro is known to vary with wheel angular velocity in the same way as the variation of flow state with wheel angular velocity. As the vortex flow becomes wavy, the random drift increases.

FIG. 1 shows the variation of random drift with rotor angular velocity. The upper curve represents the characteristics obtained from gyros prior to this invention. This curve shows the increase in random drift with rotor speed, which curve becomes steeper with increased operating speeds.

In the gyro without the inventive modifications, it may be seen that when referring to FIGS. 2, 4, 6, 8, 10 and 12, there is laminar flow in the rotor web at 20 percent of the rotor speed. However, there is vortex flow at the web when the rotor speed is raised to its normal speed of 155 revolutions per second (RPS). The flow becomes turbulent at the rotor web when the rotor speed is increased to 200 percent of normal speed. Likewise in the gyro without the inventive modifications, vortex waviness exits at the outer periphery of the rotor diameter with increase in speed. The vortex flow at 30 percent of normal rotor speed exhibits very little waviness. However, at 80 percent of normal rotor speed, the waviness is substantially increased, and very much increased when the rotor achieves normal speed of 155 RPS.

SUMMARY OF INVENTION

An object of the instant invention is to provide means for minimizing random drift caused by turbulent disturbances which increase with gyro rotor angular velocity by preventing formation of wavy vortices and by suppression of turbulence in the fluid medium in which the rotor operates.

A further object is to improve free rotor inertial navigation gyros by a new method of protecting such a gyro from disturbance by prevention of turbulence in the gaseous medium surrounding the rotor.

Tests made show that the random drift of the gyro increases with increasing rotor speed. The increase of random drift was also observed to be greater for air than for lighter gases.

In order to make the photographs of FIGS. 2-13, it was necessary to use a model of transparent plastic similar to FIG. 14 which includes the web and the peripheral area of the rotor. The plastic model also included an outer enclosure. The outer enclosure was then drilled to provide an aperture into which aluminum flakes in a liquid were injected, and the enclosure resealed with plugs which are observable in FIGS. 2-7 as dark circles on these photographs. The plastic model was made for photographic purposes, so that upon vortex or turbulent action, the action would be observable in terms of the patterns made by the aluminum flakes inside the gyro during rotation of its rotor. Tests were performed on both the standard (non-inventive) gyro and on the gyro with suppression means, constituting the invention.

The graphs in FIG. 1 show the response curves of normalized drift with respect to a typical unsuppressed gyro operated at 155 RPS as a function of gyro rotor speed before and after installation of the turbulence suppression means. The flow states in the gap between the rotor outside diameter and the housing, and in the gap between the rotor web side face and the housing were observed. Since the configuration of the rotor and plastic model was the same as the actual gyro dimensions, the principle of dynamic similitude assured the same state of flow in the plastic model gyro having as well as in the gyro operated in gas, when the Reynolds numbers were equal by reducing the speed of the liquid filled plastic model.

Briefly, the reduction in vortex action and turbulence is accomplished in a gyro, having a rotor operating in a fluid medium, wherein the fluid medium is in a non-laminar flow state, by introduction of certain structural protrusions and the like. Such structural protrusions include means 42, 43, 44, 45, 46, 47 and 51, integral with component portions internal to the gyro and are effective in reducing vortex or turbulent flow within the fluid medium therein. Also, means 42, 43, 44, 45, 51 integral with component parts in the gyro are provided for reducing waviness of vortex or turbulent flow within the fluid medium internal to the gyro.

Additionally means 42 is provided for constraining vortices at the hub of the rotor. Means 43 constrains radial flow of the fluid at the web of the rotor. Means 44 constrains vortices in proximity of the web and rim of the rotor. Means 45 guides the flow of the fluid along the inner surfaces of the outer periphery or rim and at the side of face of the rotor. Means 46 are employed for maintaining the flow of said fluid medium in laminar flow state from the web area of the rotor to the outer periphery thereof along the side faces of the rotor. Means 51 constrains vortices occurring between the outer periphery of the rotor and the inner surface of the housing. Means 47, provided between the rotor and housing further reduces turbulent flow of the fluid medium, and means 51 provided as an integral portion of the inner housing of the gyro enables vectorial cancellation of forces in the spin direction due to vortices 52 created between the outer periphery of the rotor and the inner housing which vortices 52 circulate between any two said means 51, such vortices 52 rotating in opposite directions.

The vortice and turbulent constraining means which enables laminar flow of the fluid medium comprises the following components. Means 42 positioned in the hub region of the rotor are radially positioned partially circumjacent the hub region about the outer surface of the hub region of the rotor. Means 43 are positioned in the web region of the rotor and are orthogonally disposed with respect to the face of said web region for constraining radial flow thereat. Means 44 and 45 are in proximity of the web region of the rotor, means 44 is angularly disposed with respect to the face of the web of the rotor and means 45 in proximity of the rim region of the rotor is positioned substantially parallel to the web region of the rotor for minimizing vortices in proximity of the web and rim of the rotor. Means 46 positioned opposite the outer peripheral side faces of the rotor have faces which are positioned parallel to the side faces of the rotor, maintain laminar flow state in the fluid medium. Means 47 attached to the inner surface of the inner housing positioned opposite the outer periphery of the rotor being wedged between the inner housing and the stator windings of the gyro rotor drive helps to reduce turbulent flow in the fluid medium. Means 51 integral with the inner surface of the inner housing positioned opposite the outer periphery of the rotor form radial extensions from the peripheral circumference of the inner housing spaced apart from the circumjacent the outer periphery of rotor, each radial extension being parallel to any other of the radial extensions, provide for cancellation of forces due to the vortices between the inner housing of the apparatus and the outer periphery of the rotor and constrain any residual vortices thereat.

DESCRIPTION OF DRAWINGS

FIG. 1 shows the relative drift comparison characteristics normalized with respect to a typical unsuppressed gyro operated at 155 revolutions per second for a typical gyro without the inventive suppression means, and for such a typical gyro which has been modified to include the inventive suppression means, thereby showing a substantial decrease in the drift due to incorporation of this invention.

FIG. 2 is a photograph showing laminar flow in the gyro rotor web area when the rotor is being driven at 20 percent of normal speed, without suppression means installed in the gyro.

FIG. 3 is a photograph showing flow in rotor web area at 20 percent of normal rotor speed, with suppression means installed in the gyro.

FIG. 4 is a photograph showing a vortex flow in the web area when the rotor is being driven at normal speed, without suppression means installed in the gyro.

FIG. 5 is a photograph showing flow in rotor web area when the rotor is being driven at normal speed, with suppression means installed in the gyro.

FIG. 6 is a photograph showing turbulent flow in rotor web area when the rotor is being driven to 200 percent of normal speed, without suppression means installed in the gyro.

FIG. 7 is a photograph showing flow in the rotor web area when the gyro is being driven at 200 percent of normal speed, with suppression means installed in the gyro.

FIG. 8 is a photograph showing vortex flow being started at the outer periphery of the gyro rotor when the gyro rotor is being driven at 30 percent normal speed, without suppression means installed in the gyro.

FIG. 9 is a photograph showing flow at the outer periphery of the gyro rotor when the gyro rotor is being driven at 30 percent normal speed, with suppression means being installed in the gyro.

FIG. 10 is a photograph showing vortex waviness starting at the rotor outer periphery when the rotor is being driven at 80 percent normal speed, without suppression means installed in the gyro.

FIG. 11 is a photograph showing the flow at the rotor outer periphery when the rotor is being driven at 80 percent of normal speed, with suppression means installed in the gyro.

FIG. 12 is a photograph showing vortex waviness at the rotor outer periphery when the rotor is being driven at normal speed, without suppression means installed in the gyro.

FIG. 13 is a photograph showing flow at the rotor outer periphery when the rotor is being driven at normal speed, with suppression means installed in the gyro.

EXEMPLARY EMBODIMENT

Figure 14:
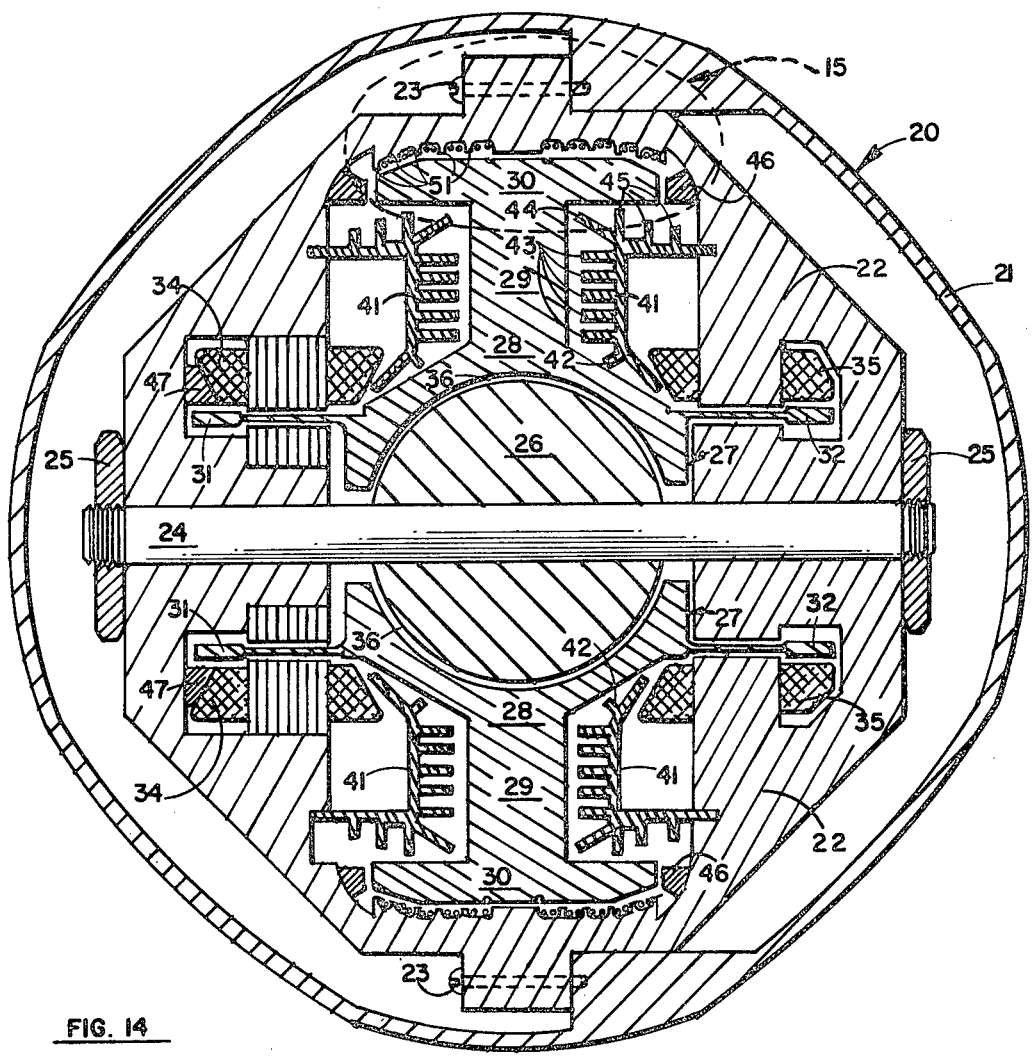
FIG. 14 is a view mostly in cross-section and partially in elevation of a gyro showing the several vortex and turbulence suppression means installed within the gyro in accordance with this invention.
Figure 15:
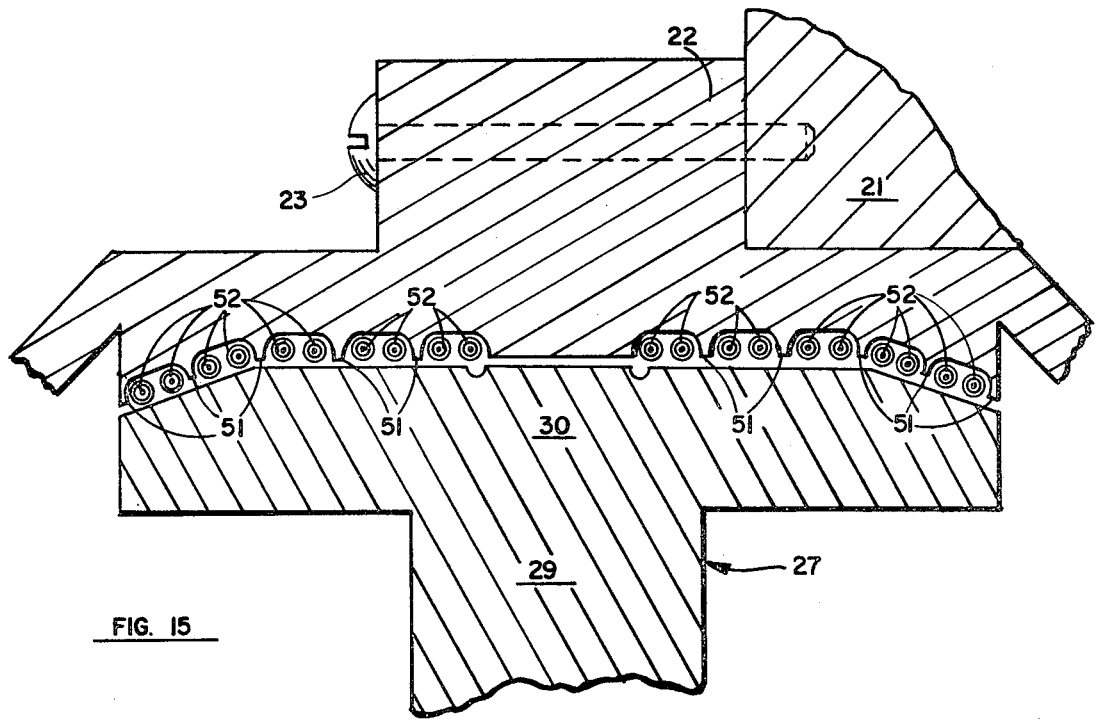
FIG. 15 is an enlarged view of a portion 15 of FIG. 14 displaying a portion of the rotor outer periphery and a portion and inner housing of the gyro, showing and displaying a series of pairs of vortices, each vortex of each pair rotating in opposite directions, enabling cancellation of vortex action at the rotor outer periphery by virtue of this invention.
Figure 16:
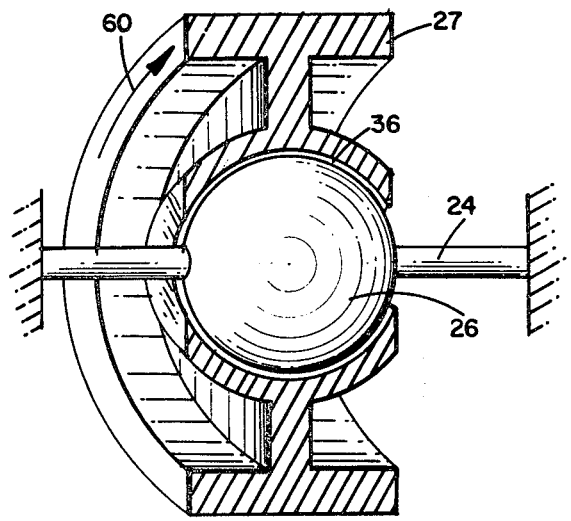
FIG. 16 is a perspective view of the supporting means for the gyro rotor partially in cross-section, for the purpose of showing the direction of the rotation of a gyro rotor.

Referring to FIGS. 14, 15 and 16 the internal cross-section of a freely rotating gyro is shown at 20, enclosed in a hermetically sealed enclosure 21. Inner housing 22 is generally metallic except that portion of the inner housing enclosure 21 and such other portions of the rotor and other members which are substituted for by plastic optically transparent material for photographing purposes, described hereinbelow.

Inner housing 22 is affixed inside enclosure 21 to enclosure 21 by means of bolts 23.

Ball support shaft 24 is stationary and held at both ends by means of nuts 25 to inner housing 22. Shaft 24 supports spherical ball 26 at the center of the gyro.

Gyro rotor 27 comprises two equally disposed members about ball 26. Each such member has a hub 28 contouredly fitted to the spherical surface of ball 26, a web section 29 at the center of the member, and a rim or outer peripheral section 30.

The rotor of the gyro is normally driven by an induction motor having drive sleeve 31 and stator windings 34, and is torqued by means of a torquer having torquer induction sleeve 32 and stator winding 35 in the conventional manner normally utilized in freely rotating gyros.

A spherical gas gap 36 between ball 26 and rotor members 27 acts as a bearing for the free rotation of rotor 27.

Windage guide 41 normally provided inside the gyro has thereon rotor hub vortex constraining means 42, radial flow constraining means 43, vortex constraining means 44, and flow baffles 45.

Flow constraining means 46 are provided between the inner housing and the side face of the rotor. Fillers 47 are also provided between the inner housing and the stator windings of the drive motor to reduce turbulence.

As an integral portion of the inner surface of the inner housing, and located opposite and outside diameter of the gyro rotor, are rotor rim vortex constraining means 51. Vortex pairs 52 occur in the spaces between each pair of means 51 and the outer periphery 30 of the rotor, each vortex of a pair being vectorially opposite to the other vortex of the pair and thereby having a cancellation effect upon the disturbance in the fluid medium at the outer periphery of the gyro rotor during rotation of the rotor, generally in the direction indicated by arrow 60, as discussed hereinbelow.

FIGS. 3, 5, 7, 9, 11 and 13 are photographic results obtained for the gyro modified with vortex and turbulent suppression means.

FIGS. 3, 5 and 7 are specifically taken at increasing gyro rotor speeds looking axially in the direction of rotor spin through the plastic housing section and through the plastic portion of the rotor, substituted for the metallic portion of the rotor, and showing the suppression of turbulent flow at the rotor web and at the channels alongside the side face of the rotor web. This improvement may be compared to the vortex and turbulent flow encountered in the unmodified gyro as illustrated in FIGS. 2, 4 and 6. The increased cloudiness with speed observable in these figures is due to migration of the aluminum flakes between the layers of the component portions constituting the plastic members substituted for the metallic members, to enable photographing the vortex and turbulent action during rotation of the gyro rotor.

Suppression means 43 adjacent the web side of the rotor is principally responsible for this reduction in vortex and turbulent flow. Turbulent and vortex flow is also reduced by means 42, 43, and 45, as shown in FIG. 14.

The modifications of the gyro constituting the invention may be clearly seen in FIGS. 14 and 15, and consist of rotor hub vortex constraining means 42, radial flow constraining means 43, vortex constraining means 44 and flow baffles 45 attached to windage guard 41, the windage guard being normally used in a gyro. Also included are flow constraining means 46 attached to inner housing 22 for constraining flow between the side of the outer diameter of the rotor and the inner housing. Fillers 47 positioned between the inner housing and drive motor stator windings also tend to constrict the flow and minimize turbulence. Vortex action is minimized by rotor rim vortex constraining means 51 positioned at the outer periphery of the rotor rim. Vortex action at the rim is reduced by creating vortex pairs due to interposition of means 51, 51 and occur in spaces between any two rotor constraining means 51 and the surface of rim of rotor 30, as may be seen by examination of FIG. 15.

FIGS. 9, 11 and 13 are results shown in photographs taken at increasing speeds of the gyro rotor looking radially inward toward the rotor outside diameter through the plastic housing of the modified gyro having turbulence suppression channels. It is seen that even at increasing speeds of 30 percent of normal, 80 percent of normal and normal speeds of 155 revolutions per second (RPS), there is substantially no vortex waviness present. This improvement may be compared to the vortex waviness starting at about 30 percent of normal speed and becoming more wavy as the speed increases to 80 percent of normal and then to normal speed, as illustrated in FIGS. 8, 10 and 12.

Referring to FIGS. 14, 15 and 16, the rotor being driven in the direction of arrow 60, turbulence and vortex action will be created in the fluid medium surrounding the rotor. Fillers 46 will also reduce turbulence at the rotor rim, while fillers 47 will also reduce turbulence due to windage at the motor-drive stator windings. At the outer periphery of the gyro rotor rim vortex constraining means 51 are provided which reduce the magnitude of the vortex thereat and create a series of vortex pairs 52 occuring in spaces between any two rotor rim constraining means 51 and outer periphery of rotor 30, as hereinabove stated. FIG. 15 most clearly shows the spacing of the channels in the inner housing adjacent the rotor outer periphery, thereby also illustrating graphically the pair of vortices 52 within each channel.

The design of the suppression means is based on knowledge of the vortex pattern which occurs in the regions adjacent to the rotor. For example, the spacing of the channels adjacent to the rotor outside diameter is twice the vortex tube width; each channel accommodates two vortices rotating in opposite directions about their circumferential axes. The suppression means prevent waviness in the vortex pattern by eliminating cross flow between vortices in directions normal to the circumferential axes of the vortices, while flow in the circumferential direction is substantially unimpeded. FIGS. 9, 11 and 13 show the flow in the region of the rotor outer periphery with turbulence suppression channels formed by vortex constraining means 51. The channels prevent vortex waviness at speeds below, at, and above the normal operating speed of the rotor. Without the channels, the vortices become wavy and then turbulent at speeds below, above, and at the normal operating speed of the gyro, as shown in FIGS. 8, 10 and 12.

The suppression means also cause a decrease in the Reynolds number for a given speed by providing additional area in which viscous shear occurs in the gas, namely along the channel partition walls, so that the effective clearance gap is reduced. The onset of vorticity therefore is caused to occur at higher rotor speeds.

The suppression means also cause the vortex cells to be of smaller size as would be caused by operation with small clearance gaps, thereby requiring higher rotor speeds to excite the higher frequency vortices, which result.

The suppression means therefore prevent interaction between the flow states occurring in the several regions of the gyro described as the rotor outer periphery, rotor rim side face, rotor rim inside diameter, and rotor web side face.

The suppression means are designed to present a minimum area reduced clearance gap to the rotor in order to minimize the viscous and hydrodynamic forces acting on the rotor rim inside diameter, and rotor web side face.

The suppression means are designed to present a minimum area reduced clearance gap to the rotor in order to minimize the viscous and hydrodynamic forces acting on the rotor when it is displaced relative to the housing about axes normal to spin.

The suppression means cause very little increase in the drag torque acting on the rotor so that spin motor power is nearly unaffected.

The channels along the rotor web side face are designed to prevent the formation of spiral vortices by preventing flow in the radial direction, while allowing unimpeded flow in the circumferential direction. The photographs of FIGS. 2, 4 and 6 show resultant performance due to spiral vortices which develop in the unmodified gyro due to the mixing of the radial outward flow along the rotor with the radial inward flow along the housing. FIGS. 3, 5 and 7 show the smooth flow with the absence of vortices, obtained when the concentric channel turbulence suppression means were installed.

The concentric channel means 42 adjacent to the rotor web side face has proven effective in preventing spiral vortices which have been observed to form at Reynolds numbers as low as $4.3 \times 10^3$ in the close gaps of the actual gyro configuration, whereas prior to installation of such concentric channel means prior theoretical analyses of the flow of fluid adjacent to the side face of a member rotating in an infinite medium indicated that the Reynolds number must be at least $1.9 \times 10^5$ for spiral vorticity to exist.

It is pointed out that means consisting or protrusions 42, 43, 44 and 45 provide a reduction in the Reynolds number. Likewise means or fillers 46 and 47 and protrusions 51 provide a reduction in the Taylor number, thereby reducing the vortex and turbulent flow of the fluid in the gyro and thereby approaching laminar flow characteristics therein.

It is also pointed out that turbulence and vortex reduction to assure laminar flow of the fluid medium is possible in any apparatus other than a gyro having a rotatable member or rotor.

It is pointed out that the plastic model including the suppression means 42, 43, 44, 45, 46, 47, and 51 constituting the inventive improvements are displayed in FIG. 14, and that the standard gyro without said suppression means is also characterized by FIG. 14. Hence, FIG. 14 shows the dimensions, shapes, and spacings and positioning of the aforesaid suppression means with respect to the dimensions of the other component parts of the gyro as depicted by FIG. 14. In other words, FIG. 14 is a scaled model of the gyro assembly including the suppression means, and the inventive gyro improvements may be reproduced by dimensioning the several suppression means in proportion to the other parts of the gyro such as the rotor or inner housing diameters and shaped and placed in accordance with the positions of the suppression means as depicted in FIG. 14.

We claim:

1. In an apparatus having an inner housing and a rotor within said inner housing having a web, which rotor is driven in a fluid medium, and structural members positioned within the apparatus for providing laminar flow of said fluid medium therein comprising in combination:
   means positioned in the hub region of said rotor for constraining vortices thereat;
   means positioned in the web region of the rotor for limited radial flow of said medium;
   means in proximity of the web and rim regions of the rotor for reducing vortices in said regions;
   means positioned opposite the outer peripheral side faces of the rotor for maintaining the flow of said fluid medium in laminar state from the web area of the rotor to the outer periphery thereof along said side faces;
   means integral with the inner surface of the inner housing positioned opposite to the outer periphery of the rotor for constraining vortex action by producing cancellation of forces due to the vortices occuring between the inner housing and the outer periphery of the rotor; and
   means attached to the inner surface of the inner housing for reducing turbulent flow in said fluid medium at the outer periphery of the rotor thereby providing laminar flow of said fluid medium.

2. The invention as stated in claim 1 including:
   means for constraining vortices occurring between the outer periphery of the rotor and the surfaces of the inner housing.

3. The invention as stated in claim 1, including:
   means for providing a reduction in the Reynolds number; and
   means for providing a reduction in the Taylor number.

4. The invention as stated in claim 1:

means positioned in the hub region of the rotor being radially positioned partially circumjacent said hub region about the outer surface of the hub region of the rotor;

means positioned in the web region of the rotor being orthogonally disposed with respect to the face of said web region;

means in proximity of the web region of the rotor being angularly disposed with respect to the face of the web of the rotor and the means in proximity of the rim region of the rotor being positioned substantially parallel to the web region of the rotor;

means positioned opposite the outer peripheral side faces of the rotor having faces which are positioned parallel to the side faces of the rotor;

means integral with the inner surface of the inner housing positioned opposite the outer periphery of the rotor forming radial extensions from the peripheral circumference of the inner housing and spaced apart from and circumjacent the outer periphery of rotor, each radial extension being parallel to any other of the radial extensions; and means attached to the inner surface of the inner housing being wedged in the structure of the inner housing.

* * * * *

PO-1050
(5/69)

UNITED STATES PATENT OFFICE
CERTIFICATE OF CORRECTION

Patent No. 3,706,231         Dated  December 19, 1972

Inventor(s)  Raymond Noar et al

It is certified that error appears in the above-identified patent and that said Letters Patent are hereby corrected as shown below:

Claim 1, column 8, line 40; delete "limited" and substitute therefor --limiting--.

Signed and sealed this 29th day of May 1973.

(SEAL)
Attest:

EDWARD M. FLETCHER, JR.                ROBERT GOTTSCHALK
Attesting Officer                      Commissioner of Patents